Nov. 30, 1948.  H. J. BRUSHABER  2,454,767
CONDUIT FITTING

Filed July 27, 1946  2 Sheets-Sheet 1

Inventor
Herman J. Brushaber
By Ira Milton Jones
Attorney

Nov. 30, 1948.  H. J. BRUSHABER  2,454,767
CONDUIT FITTING
Filed July 27, 1946  2 Sheets-Sheet 2
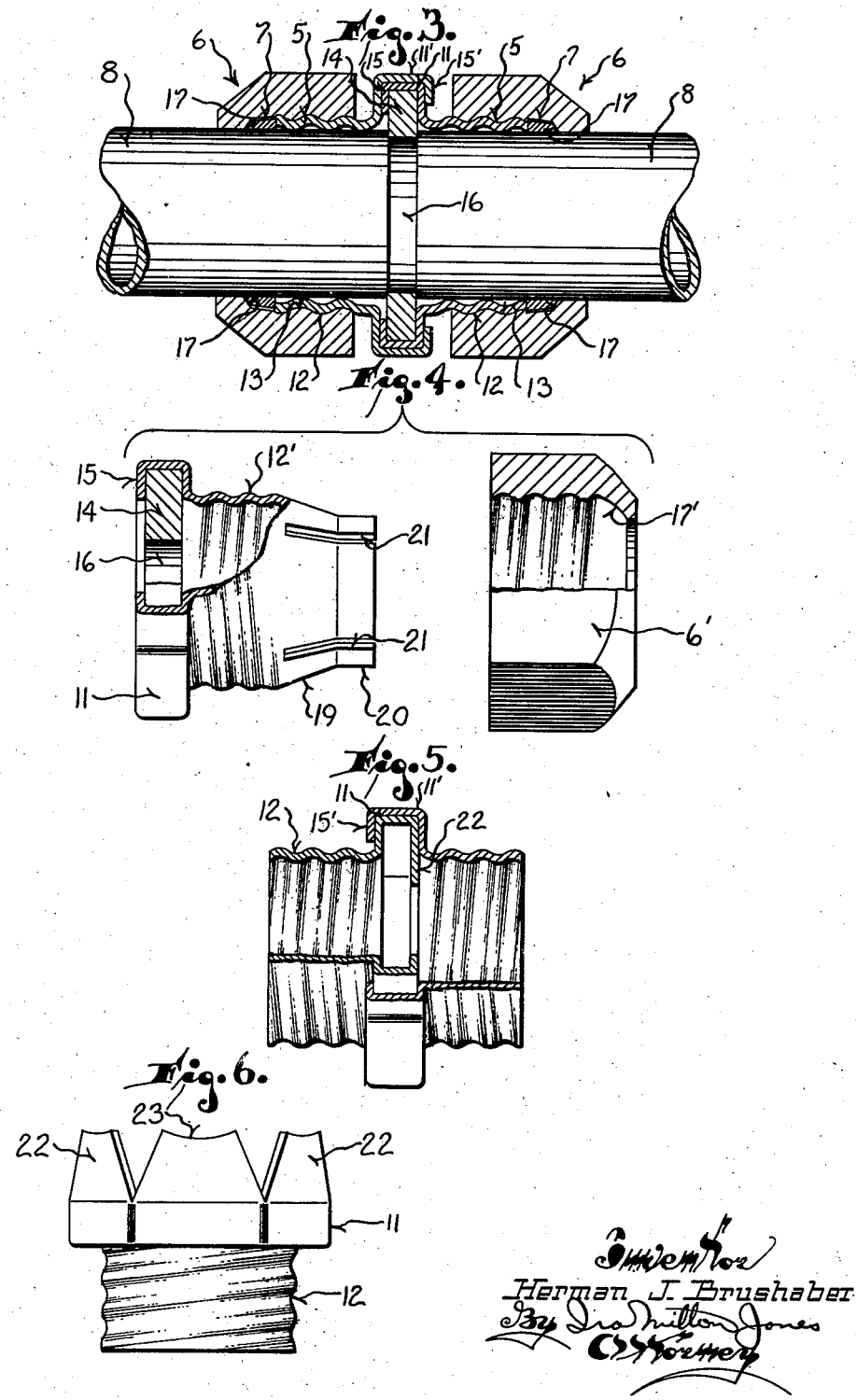

Patented Nov. 30, 1948

2,454,767

UNITED STATES PATENT OFFICE 2,454,767

CONDUIT FITTING

Herman J. Brushaber, Milwaukee, Wis.; Ralph E. Brushaber executor of said Herman J. Brushaber, deceased Application July 27, 1946, Serial No. 686,611

7 Claims. (Cl. 285—123)

This invention relates to conduit or pipe fittings and has a general object to provide a better fitting for anchoring conduit to outlet boxes used in electric wiring and for coupling lengths of conduit and/or pipe.

With a view toward reducing the cost of such fittings, this invention has as another and more specific object, the provision of a fitting of the character described wherein the main element or member thereof is a sheet metal stamping.

Another object of this invention is to provide a novel manner of reinforcing the stamped main element or member of the fitting and so incorporating the reinforcing means that it also serves as a stop to properly locate the fitting on the end of a conduit or pipe.

Still another object of this invention is to provide an improved manner of frictionally clamping the fitting to a smooth surfaced conduit or pipe which is so designed that great gripping strength is achieved with a minimum amount of effort.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several examples of the physical embodiment of the invention constructed according to the best modes so far devised for the practical application of the principles thereof, and in which:

Figure 3 is a view partly in longitudinal section and partly in side elevation illustrating the application of this invention to a coupling for conduit and pipe;

Figure 4 is a view in side elevation with parts broken away and in section illustrating the application of this invention to a fitting for anchoring BX cable to outlet boxes and the like;

Figure 5 is a view similar to Figure 3 illustrating a somewhat modified adaptation of this invention to a coupling; and Figure 6 is a detail view in side elevation illustrating one of the elements of the coupling shown in Figure 5 prior to final formation thereof.

Figure 1:
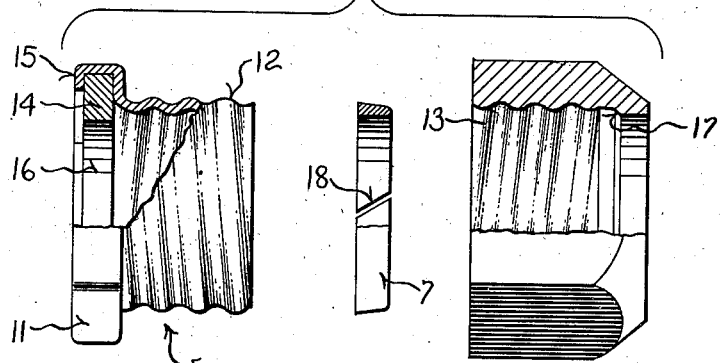
Figure 1 is a view in side elevation with parts broken away and in section of the several elements of a fitting of the type designed to anchor conduit to outlet boxes in accordance with this invention.
Figure 2:
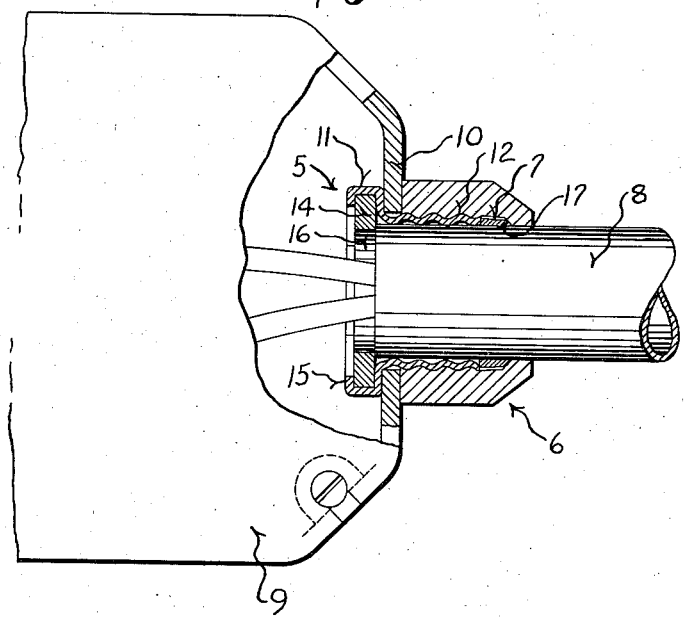
Figure 2 is a top plan view of an outlet box with the fitting of this invention applied thereto; the fitting in said view being shown longitudinal section.

Referring now more particularly to the accompanying drawings in which like numerals designate like parts, the numerals 5 and 6 designate respectively, the male and female parts or elements of a fitting embodying this invention. These parts are adapted for screw threaded connection, and upon such connection constrict a clamping ring 7 to cause the same to securely grip a conduit or pipe 8 on which the fitting is mounted. The fitting may be used to anchor conduit to an outlet box 9 as shown in Figure 2 in which case the apertured wall 10 of the outlet box to which the conduit is to be secured is clamped between a head 11 on the male element 5 and the adjacent end of the nut or female element 6. If the fitting is adapted for use as a coupling, the structure consists substantially of two complete units of the type employed to anchor conduit to an outlet box, connected together back to back in a manner to be hereinafter more fully described.

One of the features of the invention resides in the fact that the male element 5 is stamped from sheet metal. Thus its circular stem portion 12 which is screw threaded to engage the threads 13 in the nut or female element 6 has a uniform wall thickness and the threads may be said to be formed of undulations or corrugations extending helically around the stem. The mating threads 13 on the nut or female element are correspondingly shaped, that is, they are relatively shallow and free from sharp edges.

The head 11 of the male element is integral with its threaded stem 12 and consists of a non-circular, preferably hexagonal enlargement having a reinforcing insert 14 clinched therein. The insert 14 is preferably stamped from relatively stiff sheet stock and has an outer configuration corresponding to that of the head 11 to snugly fit therein and be clinched in place by turning over the edges 15 of the head.

The reinforcing insert has a hole 16 coaxial with the threaded stem 12, but smaller in diameter than the bore of the stem so as to provide a stop abutment against which the end of the conduit or pipe on which the fitting is mounted bears. In this manner the fitting is quickly and easily located on the end of a length of conduit or pipe and undesirable protrusion of the end of conduit into an outlet box is precluded. Preferably, the diameter of the hole 16 is slightly greater than the bore of the conduit or pipe so that it presents no sharp edges or obstructions to the movement of wires through the conduit and into or out of the outlet box.

The end of the threaded stem opposite the head 11 is cut square so that it lies in a plane normal to the axis of the stem. Thus this end of the stem serves as an abutment for the ring 7 which ordinarily is seated within the nut or female member 6 against a shoulder 17 therein. The shoulder 17 is chamfered or conical and the adjacent end of the ring 7 is likewise chamfered. Moreover the ring 7 has a tapered cross-section being thinner at its chamfered edge or end than at its opposite square edge which bears against the end of the threaded stem 12.

The ring 7 is formed of any suitable resilient metal and is split as at 18 so that its inherent resiliency retains the ring assembled with the nut or female member 6, and when not constricted by forcing the same against the shoulder or ledge 17, has an inside diameter sufficient to permit free passage of the proper sized conduit or pipe therethrough. It is, of course, understood that the fitting can be used for only one nominal pipe or conduit size. Such variations in diameter as are found in practice are, however, accommodated.

If the fitting is used to anchor conduit to an outlet box as shown in Figure 2, the nut or female member is first slipped onto the end of the conduit, the ring 7 being within the nut, and then the male element is inserted into the hole in the wall of the outlet box from inside so that its screw threaded stem projects therefrom. The end of the conduit is then inserted into the stem until it bears against the stop abutment 14 whereupon the nut or female element is threaded onto the stem and pulled down tight which brings the end of the nut against the outside of the outlet box. In so doing the ring 7 is clamped between the end of the stem and the shoulder or ledge 17, and by virtue of the angular disposition of the shoulder or ledge 17, the ring is constricted and forced into secure gripping engagement with the conduit.

The coupling adaptation of this invention as shown in Figure 3 embodies all the features of the fitting described in connection with the anchorage of conduit to outlet boxes, but in addition achieves low cost and simplicity by virtue of the manner in which the two coupling units are connected. This connection consists merely in forming the head 11' of one of the coupling elements larger than the other and in clinching the latter head within the former. The clinching is, of course, effected, by turning over the edges 15' of the larger head 11'.

The way in which the coupling is used is undoubtedly obvious from the foregoing description taken in connection with the drawings, but it should be pointed out that a single reinforcing element 14 serves as a stop abutment for both lengths of conduit or pipe 8 joined by the coupling fitting.

Where BX cable is to be anchored to an outlet box or the like, the modified embodiment of the invention illustrated in Figure 4 is found to be particularly advantageous. In this case, the threaded stem 12' of the male element of the fitting has its outer end reduced in diameter by an intervening conical portion 19 terminating in a substantially cylindrical end 20 of a size to snugly receive the BX cable to be anchored. This reduced end portion of the stem has a plurality of longitudinal slits 21 therein enabling radially inward constriction of the end portion brought about by the tightening of a nut 6' equipped with a tapered inner shoulder 17'.

The relative diameters of the bore through the shouldered end of the nut and the small diameter end of the stem are such that the stem just moves through the bore to enable the tapered shoulder 17' to engage the inclined intermediate portion 19. Obviously upon tightening of the nut, the slitted end of the stem is forced down into secure gripping engagement with the BX cable.

If desired the stop abutment to limit insertion of conduit or pipe into the fitting when used as a coupling may be formed by radially inward extensions or projections 22 on the inner head 11 as shown in Figure 5. In this case, the reinforcing insert 14 is omitted. The radially inward projections 22 are preferably formed by extending tongues from the sides of the head as shown in Figure 6 and folding these tongues down into a common transverse plane. In this manner substantial rigidity is affected and by properly proportioning the tongues and cutting the ends thereof arcuately as at 23, a round hole of the proper diameter will be defined by the inner edges of these tongues as the tongues are folded down.

From the foregoing description taken in connection with the accompanying drawings, it will be readily apparent to those skilled in this art that this invention provides a conduit and pipe fitting which has many advantages and which can be manufactured at low cost.

What I claim as my invention is:

1. A fitting for anchoring and coupling smooth surfaced conduit and pipe in which a tubular male member is externally threaded to receive a nut, and means are provided for grasping a conduit or pipe received within the male member upon tightening of the nut, characterized by the fact that: the male member is stamped from sheet metal and has an integral non-circular enlargement thereon to provide means for grasping the male member to hold the same against turning, and a metal stop abutment is clinched within the non-circular enlargement to reinforce the same and limit endwise insertion of a conduit or pipe into the male member.

2. A conduit fitting comprising: a tubular male member the walls of which are of uniform thickness, said male member having a circular threaded stem and a non-circular enlarged head; an apertured insert clinched within the non-circular head and extending thereacross with its aperture substantially coaxial with the stem and the inner peripheral portion of the insert forming a stop abutment engagable with the end of a pipe or conduit received in the tubular male member; a nut threaded on the stem; and means operable upon tightening of the nut onto the stem for clamping a conduit or pipe in the fitting.

3. A conduit fitting comprising: a tubular member stamped from sheet metal and having a screw threaded circular stem and an integral non-circular head; a stiffening and reinforcing insert clinched within the head, said insert having a hole therethrough substantially coaxial with the stem but smaller than the inner diameter thereof so as to provide a shoulder against which a conduit or pipe received within the stem may abut to locate the fitting thereon; a nut threaded on the stem and having a constricted end provided with an internal shoulder of a diameter to lie opposite the end of the stem; and a compression ring within the nut and engaged by the shoulder therein so as to be clamped against the end of the stem and onto a conduit or pipe on which the fitting is mounted upon tightening of the nut.

4. A conduit fitting comprising: cooperating male and female elements having a screw threaded connection therebetween and adapted to fit onto the exterior of a conduit or pipe; the male element being a tubular member formed of sheet metal with a circular stem helically corrugated to provide a screw thread, and a non-circular head integral with the stem; the female element having an internal screw thread fitting that of the male member; an insert secured within the non-circular head with a portion thereof forming a shoulder at the juncture of the stem and head, against which conduit or pipe may abut upon insertion thereof into the stem; and means operable upon tightening of the screw threaded connection between the male and female elements for frictionally gripping a conduit or pipe on which the fitting is mounted.

5. A conduit and pipe coupling comprising: two similar male elements each stamped from sheet metal and each having a circular threaded stem and a non-circular head integral with the stem; a reinforcing and stiffening insert clamped within the head of one of said elements; the head on the other element embracing and being clinched over the head on the first element so that said elements are secured end to end with the reinforcing insert located at their juncture, said insert having a hole therethrough smaller in diameter than the inner diameters of said threaded stems so as to provide a stop abutment engageable by conduit and pipe inserted into each of said elements; clamping nuts threaded on said elements; and means operable upon tightening of the clamping nuts for gripping conduit or pipe received within said elements.

6. A conduit and pipe coupling comprising: two substantially similar male elements, each having a circular threaded stem and an enlarged non-circular head integral with the stem; an inturned flange on one of said enlarged heads projecting into the bore of its stem to provide a stop abutment, the head on the other element embracing and being clinched over the head of the first mentioned element to thereby secure said elements together with the stop abutment serving to limit insertion of conduit or pipe into either element; a nut threaded on each of said elements; and means for clamping conduit or pipe received in each element upon the tightening of the nut.

7. A conduit fitting comprising: cooperating male and female elements having a screw threaded connection therebetween and adapted to fit onto the exterior of a conduit or pipe; the male element being a tubular member with a threaded stem adapted to fit directly over the exterior of the pipe or conduit and having a non-circular head integral therewith; an internal stop on the male element adjacent to the junction of its stem and head and against which a piece of pipe or conduit inserted into the stem is adapted to abut; the female element having a threaded bore for part of its length to fit the threads of the male element and a smaller unthreaded bore to directly receive the conduit or pipe; an abruptly tapered internal shoulder on the female element at the junction of its threaded and unthreaded bores facing but axially spaced from the end of the stem of the male element when said elements are threadedly connected; said end of the stem being normal to the axis thereof and providing an abutment; and a split sealing sleeve inside the bore of the female element having a bore to directly receive the conduit or pipe, said sleeve being substantially rigid in its axial dimension and being interposed endwise between said abutment and shoulder to bridge the space therebetween when the elements are threadedly connected, so that upon tightening the screw threaded connection between said elements the sleeve is contracted radially inwardly by said abruptly tapered shoulder into gripping engagement with an exterior surface of a piece of conduit or pipe inserted into the stem over an area of said surface substantially corresponding to the length of the sleeve.

HERMAN J. BRUSHABER.

REFERENCES CITED

The following references are of record in the file of this patent:

UNITED STATES PATENTS

| Number | Name | Date |
|---|---|---|
| 1,830,250 | Tiefenbacher | Nov. 3, 1931 |
| 1,885,581 | Bradbury | Nov. 1, 1932 |
| 2,270,926 | Briegel et al. | Jan. 27, 1942 |